(12) United States Patent
Bataller et al.

(10) Patent No.: US 10,579,675 B2
(45) Date of Patent: Mar. 3, 2020

(54) CONTENT-BASED VIDEO RECOMMENDATION

(71) Applicant: Accenture Global Solutions Limited, Dublin (IE)

(72) Inventors: Cyrille Bataller, Mougins (FR); Luis Mendez, Madrid (ES)

(73) Assignee: Accenture Global Solutions Limited, Dublin (IE)

( * ) Notice: Subject to any disclaimer, the term of this patent is extended or adjusted under 35 U.S.C. 154(b) by 651 days.

(21) Appl. No.: 15/348,773

(22) Filed: Nov. 10, 2016

(65) Prior Publication Data
US 2018/0004760 A1 Jan. 4, 2018

(30) Foreign Application Priority Data
Jun. 29, 2016 (ES) .................................. 201630878

(51) Int. Cl.
| | | |
|---|---|---|
| *G06F 16/70* | (2019.01) | |
| *G06F 16/78* | (2019.01) | |
| *G06N 20/00* | (2019.01) | |
| *G06N 5/04* | (2006.01) | |
| *G06F 16/783* | (2019.01) | |
| *G06F 16/738* | (2019.01) | |
| *G06F 16/75* | (2019.01) | |

(52) U.S. Cl.
CPC ........ *G06F 16/7867* (2019.01); *G06F 16/739* (2019.01); *G06F 16/75* (2019.01); *G06F 16/783* (2019.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2003/0101104 | A1 | 5/2003 | Dimitrova et al. |
| 2010/0220978 | A1* | 9/2010 | Ogikubo ............. G06F 3/04815 715/716 |
| 2012/0321181 | A1* | 12/2012 | Yang .................. G06K 9/00751 382/165 |

(Continued)

OTHER PUBLICATIONS

Spain Office Action for Application No. 201630878, dated Jan. 27, 2017, 8 pages.

(Continued)

*Primary Examiner* — Jau Shya Meng
(74) *Attorney, Agent, or Firm* — Fish & Richardson P.C.

(57) ABSTRACT

Methods, systems, and apparatus, including computer programs encoded on computer storage media, for providing video recommendations. For each video in a set of videos, a set of images included in the video are obtained. For each respective image in the set of images for a video, a set of one or more keywords that describe visual content depicted by the respective image is generated. Based at least on the sets of one or more keywords for at least some of the images, a set of keywords that describe the video is generated. The videos are assigned to groups based on the set of keywords generated for each video. A request is received for a video recommendation based on a first video. Data identifying a second video are provided as the video recommendation based on the second video being assigned to a same group as the first video.

19 Claims, 4 Drawing Sheets

(56) References Cited

U.S. PATENT DOCUMENTS

| | | | |
|---|---|---|---|
| 2013/0282747 A1* | 10/2013 | Cheng | G06F 16/73 |
| | | | 707/758 |
| 2015/0012946 A1* | 1/2015 | Woods | H04N 21/84 |
| | | | 725/41 |
| 2015/0037009 A1 | 2/2015 | Wang | |
| 2015/0082330 A1 | 3/2015 | Yun et al. | |
| 2015/0100587 A1* | 4/2015 | Walkingshaw | G06F 16/954 |
| | | | 707/748 |
| 2016/0103830 A1* | 4/2016 | Cheong | G06F 3/0488 |
| | | | 715/738 |

OTHER PUBLICATIONS

Spain Office Action for Application No. 201630878, dated Jul. 6, 2017, 6 pages.
Feng et al., "An Efficient Method for Automatic Video Annotation and Retrieval in Visual Sensor Networks," International Journal of Distributed Sensor Networks, vol. 2014, 8 pages.
Spain Search Report for Application No. 201630878, (with translation) dated Oct. 23, 2017, 13 pages.
Spain Office Action for Application No. 201630878, dated Oct. 25, 2016, 6 pages.

* cited by examiner

CONTENT-BASED VIDEO RECOMMENDATION

CROSS-REFERENCE TO RELATED APPLICATION

This application claims priority to Spain Application No. 201630878, filed on Jun. 29, 2016, entitled "CONTENT-BASED VIDEO RECOMMENDATION," the entirety of which is hereby incorporated by reference.

TECHNICAL FIELD

This specification relates to machine learning.

BACKGROUND

Data communication networks, such as the Internet, provide access to various types of information and content. One type of content available over the Internet is videos. For example, video-sharing websites provide access to millions of different videos. In addition, streaming services provide access to many different movies, television shows, and events. Due to the large number of videos available over the Internet, it can be difficult for users to find videos in which the users are interested.

SUMMARY

This specification describes, among other things, a system that generates data describing content of videos or other multimedia and uses the data to identify the videos or multimedia, e.g., in response to a query or to recommend to a user. For example, the system can provide video recommendations and links to the recommended videos while a user is viewing another video. The recommended videos may be videos that are deemed to be similar to the video being viewed by the user. The similarity between videos can be determined based at least on keywords that describe visual content depicted by images in the videos. For example, images can be obtained from the videos and analyzed using machine learning techniques to identify keywords that describe the images of the videos. The keywords of a video can then be compared to keywords of another video to determine the similarity between the videos.

In general, one innovative aspect of the subject matter described in this specification can be embodied in methods that include the actions of, for each video in a set of videos: obtaining a set of images included in the video; for each respective image in the set of images, generating a respective first set of one or more keywords that describe visual content depicted by the respective image; and generating, based at least on the respective first sets of one or more keywords for at least some of the images, a second set of keywords that describe the video; assigning the videos in the set of videos to groups based on the second set of keywords generated for each video; receiving a request for a video recommendation based on a first video of the set of videos; and providing, as the video recommendation, data identifying a second video of the set of videos based on the second video being assigned to a same group as the first video. Other embodiments of this aspect include corresponding systems, apparatus, and computer programs, configured to perform the actions of the methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In some aspects, the request for the video recommendation is generated in response to at least one of (i) presentation of the first video or (ii) a request for the first video.

In some aspects, assigning the videos to groups based on the second set of keywords generated for each video can include using a machine learning process to assign videos that have at least a threshold similarity into a same group. The similarity between two videos can be based on a similarity between the respective first sets of keywords generated for the two videos.

In some aspects, the second set of keywords for each video can be arranged in a sequence based on a sequence in which the images from which the keywords were generated occur in the video. The similarity between two videos can be based on a similarity between the sequence of keywords for a first video of the two videos and the sequence of keywords for a second video of the two videos.

Some aspects can include identifying, for a first video of two videos, a number of occurrences of each keyword in the second set of keywords for the first video and identifying, for a second video of two videos, a number of occurrences of each keyword in the second set of keywords for the second video. The similarity between the two videos can be based on a comparison of the number of occurrences of each keyword in the second set of keywords for the first video and the number of occurrences of each keyword in the second set of keywords for the second video.

Some aspects can include generating, for each video, a third set of keywords that describes audible content of the video. The second set of keywords that describe the video can be generated further based on the third set of keywords.

In some aspects, generating the respective first set of one or more keywords that describe visual content depicted by a given image can include using a deep learning process to generate at least a portion of the respective first set of one or more keywords. Generating the respective first set of one or more keywords that describe visual content depicted by a given image can include detecting an object depicted by the given image and including, in the respective first set of one or more keywords that describe visual content depicted by the given image, a keyword that describes the detected object.

In some aspects, generating the respective first set of one or more keywords that describe visual content depicted by a given image can include detecting a person depicted by the given image and including, in the first set of one or more keywords that describe visual content depicted by the given image, a keyword that identifies the detected person.

In some aspects, generating, based at least on the respective first set of one or more keywords for at least some of the images, a second set of keywords that describe the video can include identifying, for each keyword generated for at least one image of the video, a number of images of the video for which the keyword was generated and identifying, for inclusion in the second set of keywords, a pre-specified number of the keywords based on the number of images for which each keyword was generated.

Some aspects can include generating an index of video scenes for the set of videos. The index can include, for each video scene, a set of keywords that describe the video scene. A query that specifies at least one query term can be received. A video scene in the index can be identified based on the at least one query term matching at least one keyword included in the index for the video scene. Data specifying the identified video scene can be provided in response to the query. The second set of keywords can include keywords selected from the respective first sets of keywords for the at least some of the images.

Particular embodiments of the subject matter described in this specification can be implemented so as to realize one or more of the following advantages. Videos that may be of interest to a user can be identified more accurately using content depicted by images of the video. The similarity between videos can be determined more accurately by comparing keywords that describe content (e.g., objects, people, background, etc.) included in images obtained from the videos. Similar videos can be identified as recommendations to users to aid the users in finding videos that may be of interest to the users. By providing recommendations of similar videos in a more accurate way, the number of user queries and user requests for videos can be reduced, resulting in less bandwidth consumption, less demand on network resources used to transmit queries and videos, and fewer processing cycles for a computer processor that responds to requests for videos.

By indexing videos and video scenes using keywords generated for the videos and scenes using visual content depicted by images of the videos and scenes, search results for videos and scenes can be ranked more accurately in response to user queries. By providing better ranked search results to users, the number of queries received by a search engine can be reduced, resulting in less demand on computing resources of the search engine and improved speed in responding to queries. Users can also search for scenes that have particular content, e.g., the scene of a movie that includes a tiger, allowing users to more quickly find particular scenes. Movies accessible via the Internet and having an incorrect title can be found by searching based on the content of the movie, allowing for the identification of sites providing fraudulent copies of movies that may, for example, include false, obfuscated, or alternate titles of movies. In some implementations, video content may be searched, e.g., for events or objects shown in videos recorded by a closed-circuit television (CCTV) video surveillance system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and techniques for generating and providing recommendations for videos, e.g., movies, television shows, sports videos, events, vlogs, music videos, etc., or other content based on the content of given video. For example, a description of one or more scenes can be used to identify other videos that have a similar or related scene. Similar techniques and systems can be used to search for particular videos and/or scenes in videos. For example, the description of a scene or other video portion can be indexed based on an identifier for the video and a time at which the scene occurs in the video. When a query is received, the query can be compared to the description and scenes that have a description that match or that is similar to the query can be presented to a user that submitted the query.

In some implementations, the system obtains images, e.g., screenshots or video frames, of a video and uses the images of the video to generate a set of terms or keywords that describe the video. The system may sample the video to obtain an image at a particular frequency. The sampling frequency may be based on the number of video frames or based on time. For example, the frequency may be every frame, every other frame, every fifth frame, or another appropriate frequency. In another example, the frequency may be every second, every two seconds, or another appropriate frequency.

The system can generate keywords for each obtained image of the video. In some implementations, the system uses one or more machine processes to generate keywords that describe the content depicted by the image. For example, an image obtained from a movie may depict a car driving along a bridge on a rainy day. In this example, the system may generate the keywords "car", "bridge", and "rain" to describe the image. In another example, an image obtained from a movie may depict Barack Obama standing in front of the White House. In this example, the system may generate the keywords "Barrack Obama" and "White House" based on object recognition techniques identifying the White House in the image and person recognition techniques identifying Barack Obama in the image. The machines learning techniques used to generate the descriptions of the images may be trained using labeled images, e.g., images labeled by a user. The labels for an image can describe the content of the image.

Other data can also be used to describe each obtained image. In some implementations, the audio of the video that corresponds to the image and/or audio that occurs in the video before or after the image can be analyzed to generate keywords that describe the image. Continuing the previous car and bridge example, the audio at the image or within one or two seconds of the image may include the sound of thunder. In this example, the description of the image may be "car", "bridge", "rain", "thunder", and "storm".

The system can generate a set of keywords for the video based on the keywords generated for each obtained image. The system may include in the set of keywords the keywords that occur most often in the keywords for the images. For example, the keywords for the video may include the top-N keywords ranked based on the number of times each keyword occurs in the keywords for the images of the video. In another example, the keywords for the video may include the keywords that occur at least a threshold number of times in the keywords for the images.

In some implementations, the set of keywords for a video may be in the form of a vector of keywords. In addition, the set of keywords may be organized in the vector based on the sequence in which the images occur in the video. For example, a first vector element in the vector may include the keywords for the first obtained image; the second vector element of the vector may include the keywords for the second obtained image, and so on.

The keywords generated for a video can be used to identify other similar or related videos. For example, the keywords generated for a video can be compared to keywords generated for other videos to identify other videos that include the same or similar keywords. In some implementations, a machine learning process may group the videos into clusters based on the set of keywords generated for each video. When a user views a video in a particular cluster, the system may provide the user a list of other videos in the cluster as recommendations.

The system can also index scenes or other clips of a video with the keywords generated for the video. In this way, the system can provide video scenes or clips in response to user queries. For example, if a user submits a query "car going along bridge," the system can compare the query terms to the index. In this example, the system may identify the example scene of a car driving along a bridge on a rainy day discussed above. In response, the system may provide to the user data identifying the scene and/or a link to a video that starts at, or includes, the scene.

Figure 1:
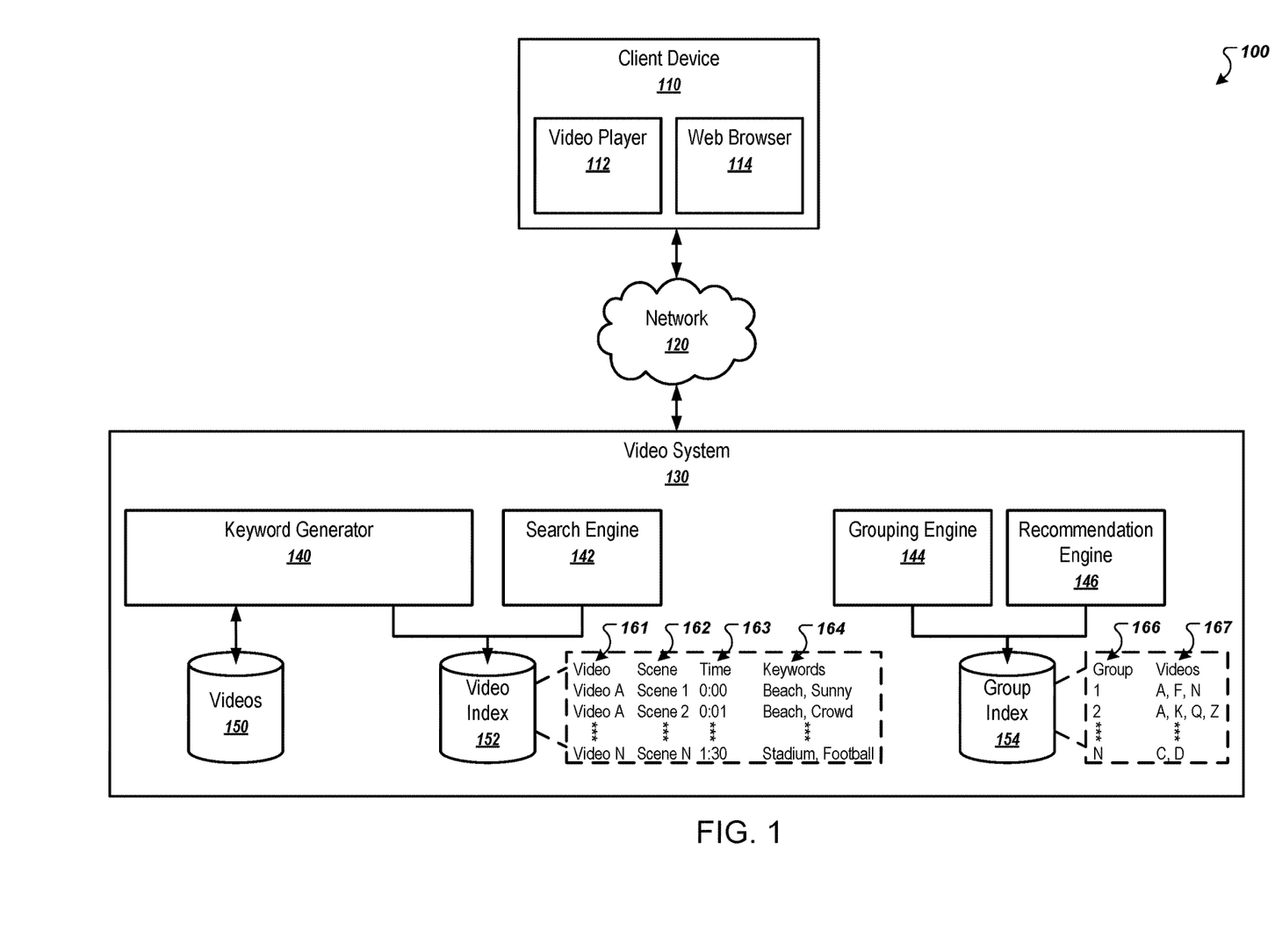
FIG. 1 is a diagram of an example environment in which a video system provides videos and/or data related to videos.

FIG. 1 is a diagram of an example environment 100 in which a video system 130 provides videos and/or data related to videos. The example environment 100 includes a client device 110 that allows users to download, store, and view videos and other content, e.g., other multimedia content. The client device 110 is an electronic device that is capable of requesting and receiving data over a data communications network 120, e.g., a local area network (LAN), a wide area network (WAN), the Internet, a mobile network, or a combination thereof. Example client devices include personal computers, mobile communication devices, e.g., smartphones and/or tablet computing devices, smart TVs or Internet TVs, e.g., a television with network connectivity or that is connected to a set top box that provides the television with network connectivity, and other appropriate devices.

The example client device 110 includes a video player 112 and a web browser 114. The web browser 114 facilitates the sending and receiving of data over the network 120. The web browser 114 can enable a user to interact with text, images, videos, music, and other information typically located on a web page at a website. In some implementations, the video player 112 is an application that facilitates the downloading, streaming, and viewing of videos, e.g., from a video streaming service or video sharing service. For example, the video player 112 may be a native application developed for a particular platform or a particular type of device, e.g., a particular type of smartphone or a smartphone that includes a particular operating system. The video player 112 and/or the web browser 114 may provide a user interface that allows users to browse or search for videos. For example, in a smart TV implementation, the video player 112 may provide a guide that is displayed on the television display and that allows a user to browse or search for movies, shows, or other videos.

The video system 130 can provide videos and/or data related to videos to client devices 110 over the network 120. For example, the video system 130 may be part of a video streaming service or a video sharing service that streams or downloads videos to client device 110. In another example, the video system 130 may be a third-party service that provides video recommendations, e.g., movie or television show recommendations, and/or video search results in response to requests for such data. In this example, a website or video streaming service may request from the video system 130 search results or recommendations in response to a user viewing a particular video or submitting a query for a video.

The video system 130 includes a keyword generator 140 that generates keywords that describe videos stored in a video storage system 150, e.g., hard drives and/or solid state drives. The keyword generator 140 can generate keywords for a video based on content of the video. In some implementations, the keyword generator 140 generates keywords for a video based on visual content depicted in one or more images obtained from the video. For example, the images may be screenshots captured from the video or video frames of the video. For each image, the keyword generator 140 can generate a set of one or more keywords that describe the visual content of the image. The visual content for which keywords are generated can include general scene content, e.g., outside, rainy, dark, etc., objects depicted in the image, e.g., cars, buildings, etc., and/or people depicted in the image. As described in more detail below with reference to FIG. 2, the keyword generator 140 can include a deep learning engine, an object recognition engine, and/or a person recognition engine to generate keywords that describe visual content depicted in the images.

The keyword generator 140 can also generate keywords for a video based on audio content of the video. For example, the keyword generator 140 can generate keywords that describe sounds, e.g., thunder, cars, birds, etc., music, e.g., particular songs, and spoken words, e.g., using speech recognition, included in the audio of the video. The keyword generator 140 can generate a set of one or more keywords for various time periods of the audio. For example, the keyword generator 140 may segment the video into a sequence of one minute video portions and generate a set of one or more keywords that describe the audio for each one minute video portion. In this example, a ten minute video may be segmented in to ten one-minute segments and one or more keywords may be generated for each segment based on the audio included in the segment.

The keyword generator 140 can generate a set of keywords that describe a video based on keywords generated for images obtained from the video and/or keywords generated based on audio of the video. For example, the keyword generator 140 may generate an aggregate set of keywords for a video based on the keywords generated for the images and the keywords generated for the audio.

In some implementations, keyword selection techniques can be used to select only a subset of the keywords generated for the images and/or a subset of the keywords generated for the audio. For example, the keyword generator 140 may identify, for each keyword, the number of occurrences of the keyword in the set of keywords generated for the images and/or the set of keywords generated for the audio. In this example, a keyword can have multiple occurrences by being generated to describe multiple different images of the video and/or generated to describe the audio for multiple different video segments. In another example, the keyword may have multiple occurrences by being generated to describe an image of the video and to describe the audio of a video segment. The keyword generator 140 can include, in the set of keywords that describe the video, each keyword that has at least a threshold number of occurrences or a particular number of keywords having the greatest number of occurrences, e.g., top 10, 50, or 100 keywords.

The set of keywords that describe a video may also include keywords obtained from sources other than the images and audio. For example, the set of keywords that describe a video may also include keywords included in metadata for the video, keywords included in the title of the video, keywords included in the description of the video, words included in closed-caption data for the video, words included in credits for the video, keywords obtained from comments or reviews related to the video, and/or keywords obtained from other appropriate sources.

The keyword generator 140 can generate a video index 152 that includes data identifying videos and the keywords generated for each video. For example, the video index 152 can include, for each video, a unique identifier for the video, e.g., a unique title or numeric code, and the set of keywords generated by the keyword generator 140 to describe the overall video.

In some implementations, the video index 152 includes an index of scenes or other type of video segments for at least some of the videos. For example, the video index 152 can include, for each scene of a video, an identifier 161 for the video in which the scene occurs, a unique identifier 162 for the scene, a time 163 at which the scene occurs in the video, and keyword(s) 164 generated for the scene. As used herein, the term "scene" may refer to a particular scene of a movie or television show or another type of video segment that is less than the full video. For example, a scene may be a portion of a video for which keywords have been generated by the keyword generator 140. In this example, the video index 152 may include a scene and its corresponding keywords for each image for which the keyword generator 140 generated keywords.

Consider, for example, a ten minute video. The keyword generator 140 may obtain an image from the video every ten seconds, resulting in a set of sixty images for the video. The keyword generator 140 may then generate, for each of the sixty images, a set of one or more keywords that describe the image. In this example, the video index 152 may include, for the ten minute video, an entry for each image resulting in sixty entries for the video. The entry for each image may include a unique identifier for the scene that corresponds to the image, a time at which the scene occurs in the video, e.g., the time within the video at which the image was obtained, and the keyword(s) generated for the image. In addition, or in the alternative, the entry for each image may include keyword(s) generated based on the audio of the video at the time the image is depicted in the video and/or the audio that occurs a specified amount of time before and/or after the image is depicted in the video. For example, the entry for a particular image may include the keyword(s) generated for the image and keyword(s) generated for the audio of a ten second video segment that begins five seconds before the image is depicted in the video and ends five seconds after the image is depicted in the video.

The keywords generated for each video and/or for each scene of a video can be used to identify similar videos and/or to surface particular video scenes in response to search results. For example, the video system 130 can include a search engine 142, a grouping engine 144, and a recommendation engine 146. The search engine 142, grouping engine 144, and recommendation engine 146 can each be implemented in one or more servers, e.g., located in one or more data centers.

In some implementations, the keyword generator 140 can also generate keywords for collections of images and/or sequences of images and generate an index for the collections and/or sequences. The index can include, for each collection or sequence, data identifying the collection or sequence and one or more keywords for each image in the collection or sequence. In this way, a user can search for particular images in the collection or sequence. For example, a collection of images may be images obtained from a surveillance camera. In this example, a user may search for images that include a particular object, e.g., a weapon, or particular clothing, e.g., a baseball cap.

The search engine 142 can receive queries from client devices 110 or other sources and provide search results that identify and/or link to videos or scenes in response to the queries. The search engine 142 can use the video index 152 to identify videos or scenes that are responsive to a received query. For example, the search engine 142 can compare terms included in a query to the keyword(s) generated for each video and/or to the keyword(s) generated for each scene. The search engine 142 can identify the videos and/or scenes that have at least one corresponding keyword that matches at least one term of the query. The search engine 142 can then provide search results for at least a portion of the identified videos or scenes. For example, the search engine 142 may rank the videos and/or scenes and provide search results for a specified number of the top ranked videos and/or scenes. The videos and/or scenes may be ranked based on the number of matching terms between the query and the videos and/or scenes, the quality of the videos and/or scenes, the popularity of the videos and/or scenes, (e.g., in terms of the number of times the videos or scenes have been viewed, and/or other appropriate ranking criteria.

A search result for a video or scene can include text identifying video or scene and/or text describing the video or scene. The search result can also include a link to the video or scene. A search result for a particular scene of a video may include a link to a video that includes only the particular scene. In another example, a search result for a particular scene may include a link to the start of the particular scene within the video that includes the particular scene. For example, user interaction with the link or the search result may cause the client device 110 to load the video, e.g., in the video player 112 or the web browser 114) and initiate the video at the start time for the particular scene.

The search engine 142 can also allow users to search for a video that may be indexed or posted on the Internet using different titles. For example, by searching for movies that are indexed based on the content of the movies, fraudulent postings of the movies using different titles can be found.

The search engine 142 can also allow users to search for particular scenes within a particular video. For example, the search engine 142 may provide a user interface 114 within the web browser 114 that allows the users to select a video and enter keywords into a search box. The search engine 142 can then use the video index 152 to identify scenes within the selected video that are responsive to the entered query. For example, a user may search for the "chase scene" in a particular movie. In some implementations, the user may enter keywords into the search box without first selecting a particular movie, and may perform a search based on the keywords across many movies based on their content. Thus, if a user entered the query "chase scene," the search engine 142 may return results from one or multiple videos that are determined to have a chase scene. Moreover, the search results may indicate the particular locations in the respective videos in which the chase scenes occur so that, e.g., the user may simply click on a representation of a given movie to be taken directly to a playing of the relevant scene specified in the search result.

The grouping engine 144 can identify similar or related videos or scenes and generate groups of similar or related videos or scenes. In some implementations, the grouping engine 144 groups videos based on the similarity between keywords generated for the videos. For example, the grouping engine 144 may compare the set of keywords generated by the keyword generator 140 for a first video to the set of keywords generated by the keyword generator 140 for a second video to determine a level of similarity between the first video and the second video. If the first video and the second video have a level of similarity that satisfies a threshold level of similarity, the first video may be included in a group with the second video.

The level of similarity between two videos may be determined using cosine similarity. For example, each video may be represented by a vector that represents the associated keywords for the video. Cosine similarity can be used to determine the similarity between the vectors for the videos.

The level of similarity between two videos may be based on the number of common keywords for the two videos. For example, the level of similarity for the two videos may be proportional to the number of keywords generated for the first video that matches keywords generated for the second video. The level of similarity between two videos may be based on the number of occurrences of keywords for the first video and the number of occurrences of keywords for the second video. For example, a keyword can occur multiple times for a video if the keyword is generated to describe multiple images of the video. If the two videos have common keywords that also occur multiple times for both videos or that occur a similar number of times for both videos, the videos may have a higher level of similarity than if keywords that occur multiple times for the first video do not occur multiple times for the second video.

In some implementations, the level of similarity between two videos may be based on the sequence in which the keywords occur for the two videos. For example, the set of keywords for each video may be arranged in the order of the images and/or audio for which the keywords are generated. In particular, the keyword(s) generated for the first image depicted by a video or the first image obtained from the video may be arranged first in the set of keywords, the keyword(s) generated for the second image depicted by the video or the second image obtained from the video maybe arranged after the keywords generated for the first image, and so on. The grouper engine 144 can compare the sequence of keywords for the first video to the sequence of keywords for the second video to determine the level of similarity between the two videos.

The level of similarity between the two videos may be based on the number of keywords that occur in the same sequence or in similar sequences and/or the number of matching or similar sequences of at least a specified number of keywords, e.g., at least three keywords in sequence. Two similar sequences of keywords may be sequences that include the same keywords, but that also include no more than a specified number of additional keywords. For example, a sequence of keywords for the first video may be "dog, jump, fence, road" based on keywords generated for one or more images of the first video. A sequence of keywords for the second video may be "dog, cat, jump, fence, yard, road." These two sequences may be deemed similar sequences due to the common sequence of "dog, jump, fence, road" in the keywords for both videos, although the keywords for the second video includes additional keywords of "cat" and "yard" not included in the keywords for the first video.

Two sequences of keywords may be deemed similar sequences if less than a specified number of keywords are out of sequence. For example, the sequence of keywords for the first video may be "dog, jump, fence, road" based on keywords generated for one or more images of the first video. A sequence of keywords for the second video may be "dog, fence, jump, road." These two sequences may be considered similar sequences due to the sequences including four common keywords although two of the keywords are transposed.

In some implementations, the grouping engine 144 uses a machine learning process to assign videos or scenes to groups based on the similarity between the sets of keywords and/or the sequence of the keywords generated to describe the videos or scenes.

The grouping engine 144 can generate a group index 154 that includes data regarding the groups of similar videos or scenes. The group index 154 can include, for each group, a unique identifier 166 for the group and data specifying the videos or scenes 167 assigned to the group.

Figure 3:
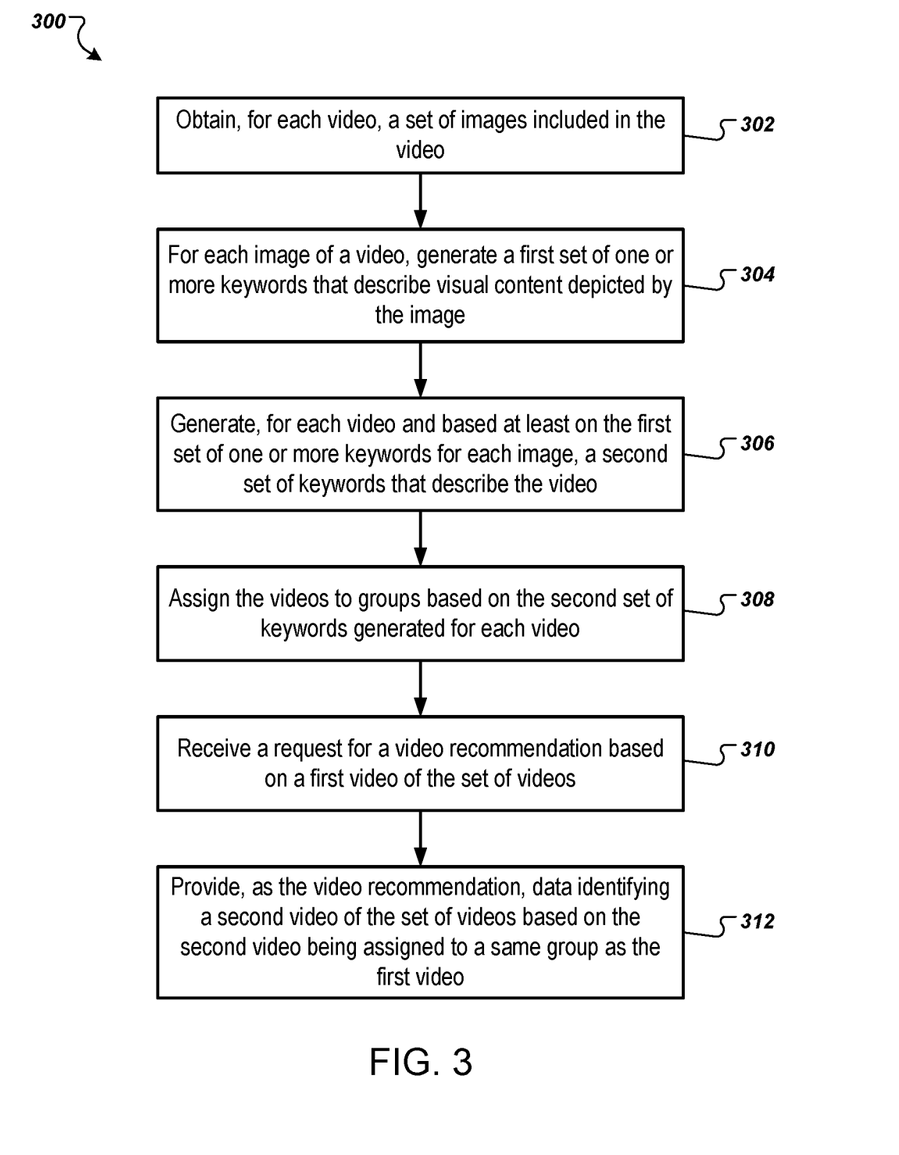
FIG. 3 is a flow chart of an example process for providing a video recommendation.

The recommendation engine 146 can provide video recommendations based on the groups generated by the grouping engine 144. The recommendation engine 146 can recommend videos or scenes that are similar to a video or scene being viewed by a user or videos or scenes that are similar to a video or scene requested by a user. For example, the video player 112 or the web browser 114 may present video recommendations in a user interface in which a video is played. When the client device 110 requests a video, e.g., from the video system 130, the recommendation engine 146 can access the group index to identify one or more groups in which the requested video is a member. The recommendation engine 146 can then select one or more videos that are included in the identified group(s) for recommendation to the user of the client device 110 from which the request was received. An example process for providing a video recommendation is illustrated in FIG. 3 and described below.

The search engine 142 can also allow a user to search for similar videos using the group index 154. For example, the search engine 142 can provide a user interface within the web browser 114 that allows a user to select a video and request videos that are similar to the selected video. In another example, the video player 112 may include an icon that, when selected, submits a request to the search engine 142 for videos that are similar to a video being presented at the client device 110. The search engine 142 can access the group index 154 to identify other videos that are included in the same group(s) as the selected video or the video being presented at the client device 110. The search engine 142 can then provide data specifying the similar videos for presentation at the client device 110.

Figure 2:
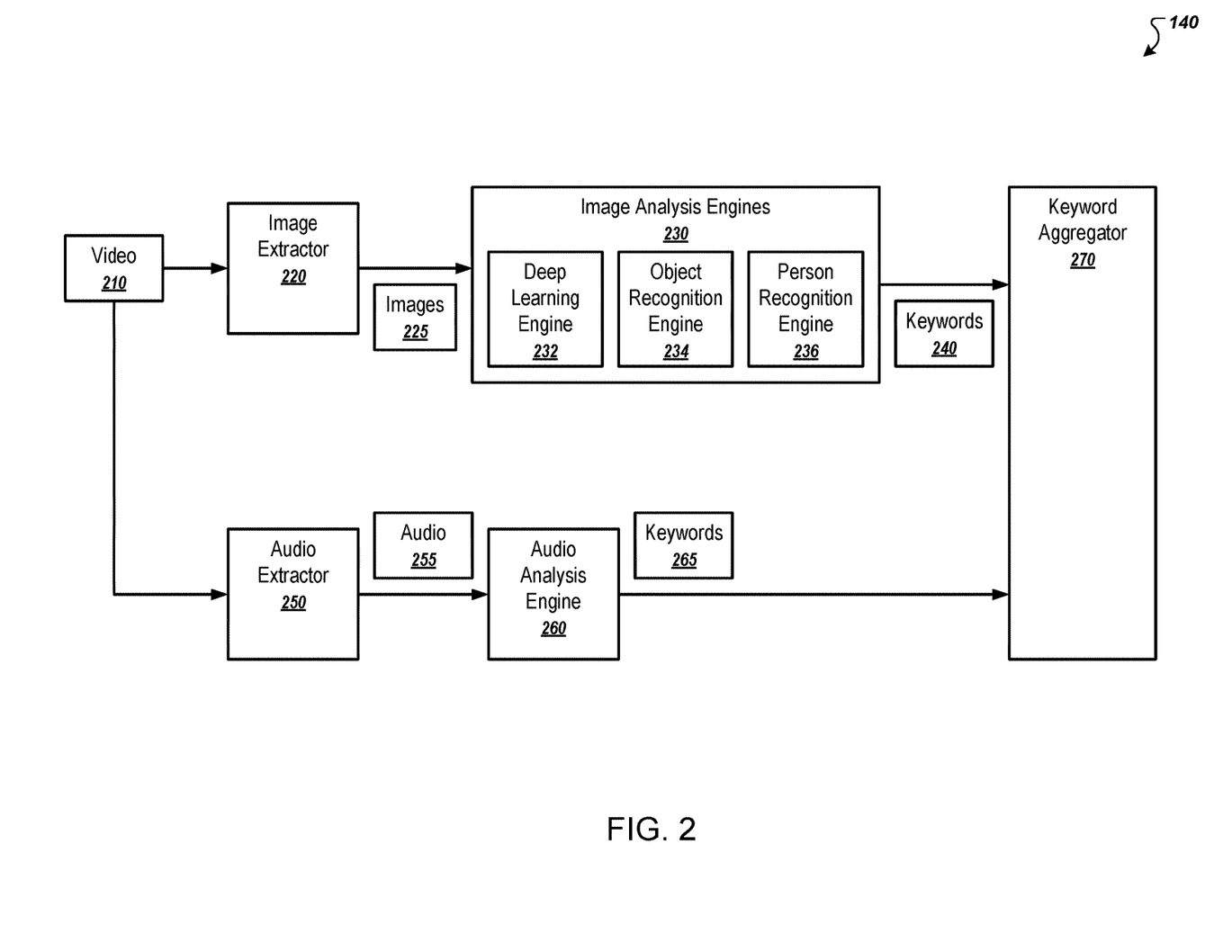
FIG. 2 is a diagram of an example keyword generator.

FIG. 2 is a diagram of the example keyword generator 140 of FIG. 1. The keyword generator 140 includes an image extractor 220 and an audio extractor 250 that both receive a video 210. The image extractor 220 can obtain a set images 225 from the video 210 and provide the set of images 225 to one or more images analysis engines 230. The image extractor 220 can obtain the set of images 225 by capturing screenshots of the video 210 at a sampling frequency or by extracting video frames from the video 210 based on the sampling frequency. The sampling frequency may be based on the number of video frames or based on time. For example, the frequency may be every frame, every other frame, every fifth frame, or another appropriate frequency.

In another example, the frequency may be every second, every two seconds, every ten seconds, or another appropriate frequency.

The example keyword generator 140 includes a deep learning engine 232, an object recognition engine 234, and a person recognition engine 236. Other implementations can include only one or two of the engines 232-236 or additional engines not illustrated in FIG. 2. The deep learning engine 232 can use one or more deep learning techniques, e.g., of a deep learning stack, to generate or select one or more keywords that describe visual characteristics an image. In some implementations, the deep learning engine 232 may generate keywords that describe overall or high level visual content of the image. For example, the deep learning engine 232 may analyze visual characteristics of an image to identify environmental characteristics, e.g., inside, outside, light, dark, rain, snow, etc., and/or location characteristics, e.g., city, beach, mountains, farm, etc.

The object recognition engine 234 can use one or more object recognition techniques to identify objects in an image and generate keywords that describe the object. For example, the object recognition engine 234 can use edge-detection techniques, scale-invariant feature transform (SIFT) techniques, bag-of-words techniques, and other appropriate techniques for detecting objects in images. For each detected object, the object recognition engine 232 can generate one or more keywords that describe the object.

The person recognition engine 236 can use one or more person recognition techniques to identify people in an image and generate keywords that identify and/or describe the people. For example, the person recognition engine 236 can use facial recognition techniques to detect known people in an image. The person recognition engine 236 can also analyze visual characteristics of an image to determine or predict the gender, age, or other characteristics of an unrecognized person and generate keywords that describe these characteristics.

Each of the engines 232-236 can be trained using labelled training data. The labelled training data can include images that have labels that describe the images. For example, a user may label the images based on what the user sees in the image. The engines 232-236 can then be trained to generate keywords that correctly describe what other images depict. The engines 232-236 can be trained until they each generate keywords that correctly describe at least a threshold percentage of testing images.

For a video 210, each of the engines 232-236 can analyze each image in the set of images 225 and generate a set of one or more keywords that describe the image based on its respective analysis of the image. Each of the keywords 240 generated by the engines 232-236 can then be provided to a keyword aggregator 270 that aggregates the keywords for the video, as described below.

The audio extractor 250 can extract or otherwise obtain audio 255 from the video 210. The extracted audio may be a continuous stream of audio for the entire video or a set of audio segments. For example, the audio extractor 250 may segment the video 210 into a sequence of one minute, two minute, or three minute successive video portions and extract the audio from each video portion. In another example, the audio extractor 250 may extract audio from the video for each image. In this example, the audio for an image may include audio that occurs in the video 210 prior to the point in the video at which the image occurs and audio that occurs in the video 210 after the point in the video at which the image occurs. For example, if an image is obtained from the video at a point two minutes from the beginning of the video, the audio for the image may include the audio starting at one minute and fifty seconds from the beginning of the video and ending at two minutes and ten seconds from the beginning of the video.

The audio extractor 250 can provide the extracted audio to an audio analysis engine 260. The audio analysis engine 260 can analyze the audio 255 to identify sounds included in the audio 255. For example, the audio analysis engine 260 may compare the audio to known sounds to detect sounds in the extracted audio. In another example, the audio analysis engine 260 may use speech recognition to detect words spoken in the audio.

The audio extractor 260 can generate one or more sets of keywords 265 based on the sounds detected in the extracted audio. For example, if the audio is a single continuous stream, the audio extractor 260 may generate a set of keywords based on the sounds detected throughout the extracted audio. The set of keywords may be arranged in order based on the order in which the sounds occur in the audio and thus, the order in which the sounds occur in the video 210. If the audio is segmented, e.g., based on image or video portions, the set of keywords may include a subset of one or more keywords for each image or video portion. The subsets can also be arranged in the order in which the images or video portions occur in the video 210. The audio analysis engine 260 can provide the keywords 265 to the keyword aggregator 270.

The keyword aggregator 270 can aggregate the keywords 240 received from the image analysis engines 230 and/or the keywords 265 received from the audio analysis engine 265 into a set of keywords that describe the video. In some implementations, the keyword aggregator 270 may generate a combined list of keywords that includes each keyword generated by the image analysis engines 230 for the video 210 and each keyword generated by the audio analysis engine 265 for the video 210.

In some implementations, the keyword aggregator 270 includes only a subset of the keywords 240 and the keywords 265 in the set of keywords that describe the video 210. For example, the keyword aggregator 265 may include the most popular keywords generated for the video 210 in the set of keywords that describe the video 210. In this example, the keyword aggregator 270 may identify, for each keyword generated by an image analysis engine 230 or the audio analysis engine 260 for the video 210, e.g., each keyword included in the keywords 240 and the keywords 265 for the video 210, a number of occurrences of the keyword in the keywords 240 and the keywords 265. For example, a keyword may have three occurrences if the keyword was generated by the image analysis engines 230 for two different images and the keyword was generated by the audio analysis engine 260 for one video segment. The keyword aggregator 270 can then select, for inclusion in the set of keywords for the video 210, the keywords that have at least a threshold number of occurrences or a particular number of keywords that have the greatest number of occurrences. For example, the set of keywords for the video may include the keywords that have at least three occurrences in the keywords 240 and/or the keywords 265. In another example, the keyword aggregator 270 may rank the keywords based on the number of occurrences of each keyword in the keywords 240 and/or the keywords 265 and select the top ten, twenty, or another appropriate number of keywords in the ranking.

The keyword aggregator 270 can also aggregate the keywords 240 received from the image analysis engines 230 and the keywords 265 received from the audio analysis engine 265 into a set of keywords that describe each image obtained from the video 210. For example, as described above, the audio extractor 250 may extract audio from the video for each image and the audio analysis engine 260 may generate one or more keywords that describe the audio for each image. The keyword aggregator 270 can generate, for each image, an aggregate set of keywords for the images that includes all or at least a portion of the keywords generated for the image by the image analysis engines 230 and the audio analysis engine 260.

As described above, the keyword generator 140 can generate or populate an index, e.g., video index 152 of FIG. 1 with data related to videos. For example, the index can include data identifying the video, e.g., a unique identifier, and the set of keywords that describe the video generated by the keyword aggregator 270. The index can also include, for each image, data identifying a scene that corresponds to the image and the keywords generated for the image. The index can then be used to search for videos and video scenes in response to received queries.

FIG. 3 is a flow chart of an example process 300 for providing a video recommendation. The process 300 can be implemented by one or more computer programs installed on one or more computers. The process 300 will be described as being performed by an appropriately programmed system of one or more computers, e.g., the video system 130 of FIG. 1.

The system obtains, for each video of a set of videos, a set of images included in the video (302). For example, the system may obtain a set of screenshots or video frames from each video based on a sampling frequency.

For each image of each video, the system generates a respective first set of one or more keywords that describe visual content depicted by the respective image (304). For example, each image can be analyzed using deep learning techniques, object recognition techniques, person recognition techniques, and/or other image analysis techniques to generate keywords that describe the visual content depicted by the image. The set of one or more keywords for a given image can include the keywords generated based on each of the analyses. In some implementations, the set of one or more keywords for an image can also include keywords generated based on audio of the video that occurs at the same time as the image in the video or audio that occurs within a specified time before and after the image occurs.

The system generates, for each video in the set of videos, a second set of keywords that describe the video (306). The second set of keywords for a given video can include at least a portion of the keywords included in the first set of keywords generated for at least some of the images obtained from the video. For example, the system may select some of the keywords from the first sets of keywords generated for at least some of the images obtained from the given video. As described above, the set of keywords for a video can be selected based on the number of occurrences of the keywords in sets of keywords generated for the images of the video.

In some implementations, the second set of keywords for a given video can also include keywords included in metadata for the given video, keywords included in the title of the given video, keywords included in the description of the given video, words included in closed-caption data for the given video, words included in credits for the given video, keywords obtained from comments or reviews related to the given video, and/or keywords obtained from other appropriate sources. The system may assign videos that have at least a threshold level of similarity with one another to a group.

The system assigns the videos in the set of videos to groups based on the second set of keywords generated for each video (308). For example, the system may use one or more machine learning techniques to assign the videos to groups based on the similarity between the second sets of keywords for the videos.

The level of similarity between two videos may be based on a comparison of the second set of keywords for the two videos independent of sequence. For example, the level of similarity between two videos may be based on a comparison of the number of occurrences of each keyword in the second set of keywords for a first video of the two videos and the number of occurrences of each keyword in the second set of keywords for a second video of the two videos.

In another example, the level of similarity between two videos may be based on a comparison of the sequence of keywords in the second set of keywords for the two videos. For example, if the second set of keywords for each video has similar sequences of keywords, the videos may have similar sequences of scenes indicating that the videos are similar.

The system receives a request for a video recommendation based on a first video of the set of videos (310). The request for the video recommendation may be transmitted from a client device to the system in response to presentation of the first video. For example, video recommendations may be presented adjacent to a window or display area in which the first video is being presented. When the first video is being presented, a video player or web browser presenting the video may cause the client device to send a request to the system for video recommendations.

The request for the video recommendation may be transmitted from the client device to the system in response to a request for the first video. For example, if a user interacts with, e.g., selects, a link to the first video, the client device may transmit the request to the system to obtain video recommendations to present with the first video.

The system provides data identifying a second video in the set of videos based on the second video being assigned to a same group as the first video (312). For example, the system may identify each group in which the first group is a member in response to the request for the video recommendation. The system may then select the second video from one of the identified groups, or the one group if the first video is assigned to only one group, and provide data identifying the second video to the client device from which the request was received.

The system may also provide a link to the second video. In this way, if the user is interested in the recommended second video, the user can easily access the second video. For example, user interaction with the link may cause the video player or web browser that is presenting the first video to navigate from the first video to the second video.

In some implementations, the system may provide as recommendations data identifying multiple videos. For example, the first video may be assigned to one or more groups that include multiple different videos. The system can provide data identifying at least a portion of the multiple different videos as recommendations.

Figure 4:
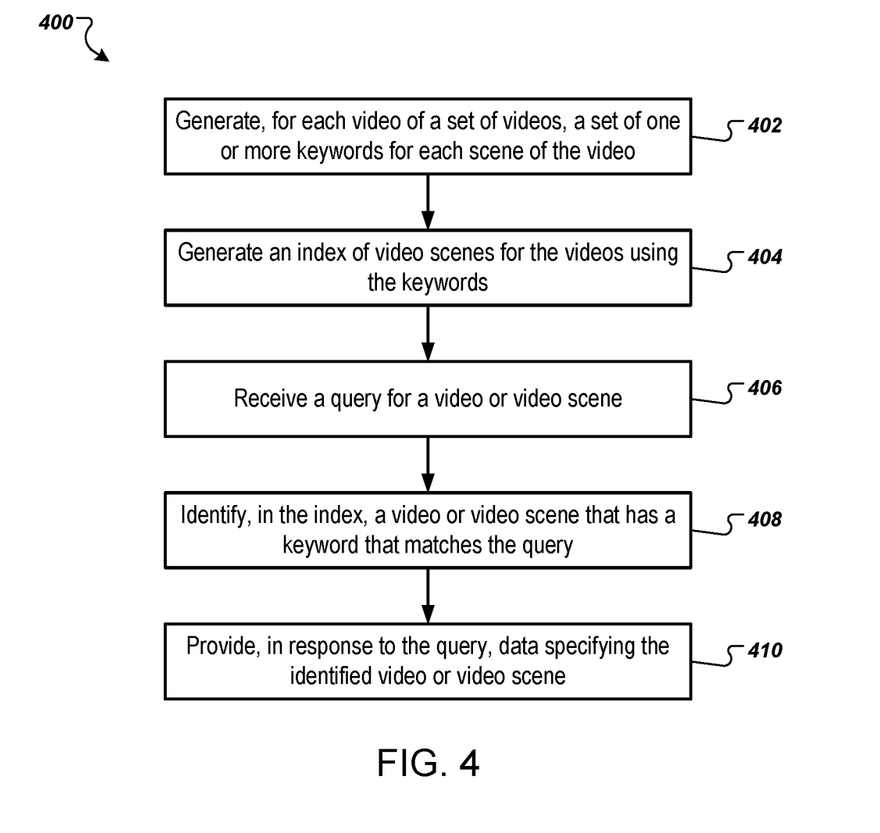
FIG. 4 is a flow chart of an example process for providing data specifying a video or video scene.

FIG. 4 is a flow chart of an example process 400 for providing data specifying a video or video scene. The process 400 can be implemented by one or more computer programs installed on one or more computers. The process 400 will be described as being performed by an appropriately programmed system of one or more computers, e.g., the video system 130 of FIG. 1.

The system generates, for each video of a set of videos, a set of one or more keywords for each scene of the video (402). The set of one or more keywords for a given scene may be generated based on one or more images obtained from the video and that are depicted by the video during the scene. For example, each of the one or more images for a scene can be analyzed using deep learning techniques, object recognition techniques, person recognition techniques, and/or other image analysis techniques to generate one or more keywords that describe the visual content depicted by the image.

The set of one or more keywords generated for a scene may also be generated based on audible content that occurs in the video during the scene. For example, the audible content may be compared to known sounds and/or speech recognition can be used to generate one or more keywords that describe sounds that occur during the scene.

The system generates an index of video scenes for the videos using keyword(s) generated for each scene (404). For example, the index can include, for each scene, an identifier for the scene, an identifier for the video in which the scene occurs, and the set of one or more keywords generated for the scene. The index can also include, for each video, an identifier for the video and the keyword(s) generated for each scene of the video.

The system receives a query for a video or video scene (406). The query may be received from a client device. For example, a user of the client device may submit a query for a video. The query may include one or more query terms.

The system identifies, in the index, a video or video scene that has at least one keyword that matches at least one query term of the query (408). For example, the system may compare the query term(s) for the query to the keywords included in the index. If multiple videos or video scenes have a keyword that matches a query term of the query, the system may select a video or scene from the multiple videos or video scenes. The system may make the selection based on the number of matching terms between the query and the videos and/or scenes, the quality of the videos and/or scenes, the popularity of the videos and/or scenes, e.g., in terms of the number of times the videos or scenes have been viewed, and/or other appropriate ranking criteria.

The system provides, in response to the query, data specifying the identified video or video scene (410). For example, the system may provide, to the client device from which the query was received, a search result that specifies the identified video or video scene. The search result may also include a link to the video or scene. If the user interacts with the link, the client device may request the video or scene and present the video or scene to the user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    for each video in a set of videos:
        obtaining, by one or more computers comprising at least one processor, a set of images included in the video;
        for each respective image in the set of images, generating, by the one or more computers, a respective first set of one or more keywords, wherein the respective first set of one or more keywords describe visual content depicted by the respective image; and
        generating, by the one or more computers and based at least on the respective first sets of one or more keywords for at least some of the images, a second set of keywords that describe the video;
    assigning, by the one or more computers, the videos in the set of videos to groups based on similarity between the second set of keywords generated for each video, wherein each group includes videos that have at least a threshold level of similarity with each other video in the group;
    receiving, by the one or more computers, a request for a video recommendation based on a first video of the set of videos;
    identifying, by the one or more computers, a particular group that includes the first video; and
    providing, by the one or more computers, as the video recommendation, data identifying a second video in the particular group of videos based on the second video being assigned to a same group as the first video.

2. The method of claim 1, wherein the request for the video recommendation is generated in response to at least one of (i) presentation of the first video or (ii) a request for the first video.

3. The method of claim 1, wherein assigning the videos to groups based on the second set of keywords generated for each video comprises using a machine learning process to assign videos that have at least a threshold similarity into a same group.

4. The method of claim 1, further comprising:
identifying, for a first video of two videos, a number of occurrences of each keyword in the second set of keywords for the first video;
identifying, for a second video of two videos, a number of occurrences of each keyword in the second set of keywords for the second video,
wherein the similarity between the two videos is based on a comparison of the number of occurrences of each keyword in the second set of keywords for the first video and the number of occurrences of each keyword in the second set of keywords for the second video.

5. The method of claim 1, further comprising generating, for each video, a third set of keywords, wherein the third set of keywords describes audible content of the video, wherein the second set of keywords that describe the video is generated further based on the third set of keywords.

6. The method of claim 1, wherein generating the respective first set of one or more keywords comprises using a deep learning process to generate at least a portion of the respective first set of one or more keywords.

7. The method of claim 1, wherein generating the respective first set of one or more keywords comprises:
detecting an object depicted by the given image; and
including, in the respective first set of one or more keywords, a keyword that describes the detected object.

8. The method of claim 1, wherein generating the respective first set of one or more keywords comprises:
detecting a person depicted by the given image; and
including, in the respective first set of one or more keywords, a keyword that identifies the detected person.

9. The method of claim 1, wherein generating, based at least on the respective first set of one or more keywords for at least some of the images, a second set of keywords that describe the video comprises:
identifying, for each keyword generated for at least one image of the video, a number of images of the video for which the keyword was generated; and
including, in the second set of keywords, a pre-specified number of the keywords based on the number of images for which each keyword was generated.

10. The method of claim 1, further comprising:
generating an index of video scenes for the set of videos, wherein the index includes, for each video scene, a set of keywords, and wherein the set of keywords describe the video scene;
receiving a query that specifies at least one query term;
identifying a video scene in the index based on the at least one query term matching at least one keyword included in the index for the video scene; and
providing, in response to the query, data specifying the identified video scene.

11. The method of claim 1, wherein the second set of keywords includes keywords selected from the respective first sets of keywords for the at least some of the images.

12. The method of claim 1, further comprising:
receiving a request for a video that is similar to a given video;
identifying at least one group that includes the given video;
selecting, from the at least one group, one or more videos; and
providing data specifying the one or more videos.

13. A computer-implemented method comprising:
for each video in a set of videos:
obtaining, by one or more computers comprising at least one processor, a set of images included in the video;
for each respective image in the set of images, generating, by the one or more computers, a respective first set of one or more keywords, wherein the respective first set of one or more keywords describe visual content depicted by the respective image; and
generating, by the one or more computers and based at least on the respective first sets of one or more keywords for at least some of the images, a second set of keywords that describe the video, wherein the second set of keywords for each video are arranged in a sequence based on an order in which the images from which the keywords were generated occur in the video;
assigning, by the one or more computers, the videos in the set of videos to groups based on the second set of keywords generated for each video, including assigning videos that have at least a threshold similarity into a same group, wherein the similarity between two videos is based on a similarity between the sequence of keywords for a first video of the two videos and the sequence of keywords for a second video of the two videos;
receiving, by the one or more computers, a request for a video recommendation based on a first video of the set of videos; and
providing, by the one or more computers and as the video recommendation, data identifying a second video of the set of videos based on the second video being assigned to a same group as the first video.

14. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
for each video in a set of videos:
obtaining a set of images included in the video;
for each respective image in the set of images, generating a respective first set of one or more keywords, wherein the respective first set of one or more keywords describe visual content depicted by the respective image; and
generating, based at least on the respective first sets of one or more keywords for at least some of the images, a second set of keywords that describe the video;
assigning the videos in the set of videos to groups based on similarity between the second set of keywords generated for each video, wherein each group includes videos that have at least a threshold level of similarity with each other video in the group;
receiving a request for a video recommendation based on a first video of the set of videos;
identifying a particular group that includes the first video; and
providing, as the video recommendation, data identifying a second video in the particular group of videos based on the second video being assigned to a same group as the first video.

15. The system of claim 14, wherein the request for the video recommendation is generated in response to at least one of (i) presentation of the first video or (ii) a request for the first video.

16. The system of claim 14, wherein assigning the videos to groups based on the second set of keywords generated for each video comprises using a machine learning process to assign videos that have at least a threshold similarity into a same group.

17. The system of claim 16, wherein:
the second set of keywords for each video are arranged in a sequence based on a sequence in which the images from which the keywords were generated occur in the video; and
the similarity between two videos is based on a similarity between the sequence of keywords for a first video of the two videos and the sequence of keywords for a second video of the two videos.

18. The system of claim 16, wherein the operations further comprise:
identifying, for a first video of two videos, a number of occurrences of each keyword in the second set of keywords for the first video;
identifying, for a second video of two videos, a number of occurrences of each keyword in the second set of keywords for the second video,
wherein the similarity between the two videos is based on a comparison of the number of occurrences of each keyword in the second set of keywords for the first video and the number of occurrences of each keyword in the second set of keywords for the second video.

19. The system of claim 14, wherein the operations further comprise generating, for each video, a third set of keywords, wherein the third set of keywords describes audible content of the video, wherein the second set of keywords that describe the video is generated further based on the third set of keywords.

* * * * *